US007189965B2

(12) United States Patent
Franzen

(10) Patent No.: US 7,189,965 B2
(45) Date of Patent: Mar. 13, 2007

(54) STORAGE DEVICE FOR MOLECULAR DETECTOR

(75) Inventor: Jochen Franzen, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 11/151,557

(22) Filed: Jun. 9, 2005

(65) Prior Publication Data

US 2005/0285029 A1 Dec. 29, 2005

(30) Foreign Application Priority Data

Jun. 15, 2004 (DE) ..................... 10 2004 028 638

(51) Int. Cl.
*B01D 59/44* (2006.01)

(52) U.S. Cl. ...................... 250/283; 250/292; 250/282; 250/287

(58) Field of Classification Search ..................... None
See application file for complete search history.

(56) References Cited

U.S. PATENT DOCUMENTS

| | | | | |
|---|---|---|---|---|
| 5,504,329 | A | 4/1996 | Mann et al. | |
| 5,825,026 | A | 10/1998 | Baykut | |
| 6,107,628 | A | 8/2000 | Smith et al. | |
| 6,483,109 | B1 * | 11/2002 | Reinhold et al. | 250/292 |
| 6,987,261 | B2 * | 1/2006 | Horning et al. | 250/282 |
| 2004/0011951 | A1 | 1/2004 | Giles et al. | |
| 2006/0016976 | A1 * | 1/2006 | Land et al. | 250/282 |

FOREIGN PATENT DOCUMENTS

| | | | |
|---|---|---|---|
| DE | 195 15 271 | A1 | 4/1995 |
| DE | 199 37 439 | C1 | 8/1999 |
| GB | 2 375 653 | A | 11/2002 |
| GB | 2 381 948 | A | 5/2003 |

* cited by examiner

*Primary Examiner*—Jack Berman
*Assistant Examiner*—Zia R. Hashmi
(74) *Attorney, Agent, or Firm*—The Law Offices of Paul E. Kudirka

(57) ABSTRACT

The invention relates to ion storage devices for a molecular detector which determines the presence and quantity of a predetermined ion species out of a large number of stored ions. The invention consists in installing two or more ion storage devices in such a way that filling of one ion storage device and detection of predetermined ion species from an other ion storage device can be carried synchronously. In particular, ion filling and ion sampling can occur through the same opening.

8 Claims, 3 Drawing Sheets

STORAGE DEVICE FOR MOLECULAR DETECTOR

FIELD OF THE INVENTION

The invention relates to ion storage devices for a molecular detector which determines the presence and quantity of a predetermined ionic species out of a large number of stored ions.

BACKGROUND OF THE INVENTION

In U.S. Pat. No. 6,483,109 B1, a multiple stage mass spectrometer has been presented with which it is possible to selectively enrich and measure the quantity of predetermined ion species from a large number of stored ions. Increased precision of the m/z filtering and the option to fragment into daughter ions or even granddaughter ions mean that the selectivity of the enrichment is increased to such a degree that a practically certain determination of the desired ion species is achieved, even if ion species of the same mass are present in the initial quantity of the ions.

As the multiple stage mass spectrometer always returns unused ions to the ion storage device, termed "accumulator" below for greater clarity, it is possible to measure the quantity of a larger number of predetermined ion species sequentially from a single sample with the multiple stage mass spectrometer.

This multiple stage mass spectrometer is mainly of interest for the quantitative search for specific forms of mutations or modifications or specific expression anomalies of peptides and proteins, but there are many additional fields of application over and above these, for example the determination of the quantity of breakdown products of medicines (metabolites) as a function of time after the medicines have been administered, or the search for specific toxic substances in mixtures of substances.

The analyzing part of the multiple stage mass spectrometer will be termed "molecular analyzer" below. The molecular analyzer requires around one to three seconds to analyze one ion species. If other ion species, for example other daughter or granddaughter ions, are measured for the same substance by way of confirmation, this can be done in a further one to two seconds. Some two to five seconds are therefore required for the certain determination of a molecular species. If 20 to 100 molecule species are to be measured with double reliability measurement, this requires between one and eight minutes; on average around two to four minutes.

The accumulator should be able to collect around $10^8$ to $10^9$ ions in order to achieve a high detection sensitivity. The filling can preferably be undertaken by nanospraying from a thin capillary with an extended tip. This type of electrospray ionization is the most efficient for transferring the analyte molecules used into an accumulator located in a vacuum. It is possible to feed several $10^5$, up to a maximum of around $10^6$, ions per second into an accumulator in the vacuum. To fill the accumulator with at least $10^8$ ions therefore requires at least 100 seconds, in practice, however, more like three to six minutes or more are required. A complete analytical process with filling of the accumulator and subsequent analysis is performed in about five to ten minutes. The heart of the instrument, the molecular analyzer, is utilized quite inefficiently in this situation with a two to four minute share of the time.

The molecular analyzer consists of a chain of linear quadrupole cells operated in unison. It is very slim: at a length of around 30 centimeters without the accumulator and without the ion detector, a maximum diameter of around five to ten centimeters, including the voltage feeders and supports, is possible. With accumulator and ion detector one must expect a length of around 50 centimeters. If one also includes the nanospray device with its inlet capillary and at least one differential pump pressure stage, it is easy to end up with a somewhat unwieldy length of around 80 to 90 centimeters for the whole instrument, which is otherwise very compact.

SUMMARY OF THE INVENTION

The invention is achieved by arranging at least two accumulators in such a way that the filling of one accumulator and the analysis of the ions of an other accumulator can be undertaken so as to temporally overlap. A short configuration is achieved by filling the accumulator and sampling the ions for the analysis from the same end by arranging the spray device and molecular analyzer in parallel. The invention therefore makes it possible to achieve a better temporal utilization of the analyzer and a shorter configuration.

The accumulators can be arranged so they can revolve on a turntable, for example. Other mechanical types of motion can also be used to interchange the accumulators. It is even possible to define the storage location solely by appropriate electric RF and DC fields and to carry out the interchange of the stored ions purely electrically, for example inside two concentric cylinders constructed of parallel rods with RF voltages and wherein the ions are moved in movable DC potential depressions.

If the filling times are significantly longer than the analysis times, it is also possible to couple two or more spray devices with corresponding accumulators to a single molecular analyzer unit. Conversely, two or more analyzer units can be connected to a single spray device. This requires special support turntables which ensure that the accumulators are not all rigidly interconnected at fixed angles.

In order to keep the pumping requirements low, it is favorable to keep the accumulator in the filling position in a moderately pumped pump stage, and the accumulator in the analyzing position in the main pump stage. This can be achieved using a turntable with a partition wall which turns in a cylindrical vacuum chamber, for example.

BRIEF DESCRIPTION OF THE DRAWINGS

In FIG. 2*a* the ions from accumulator (6) are analyzed; in FIG. 2*b*, in contrast, those from accumulator (7) are analyzed. In the meantime the two accumulators (4) and (5) can be filled.

DETAILED DESCRIPTION

Figure 1:
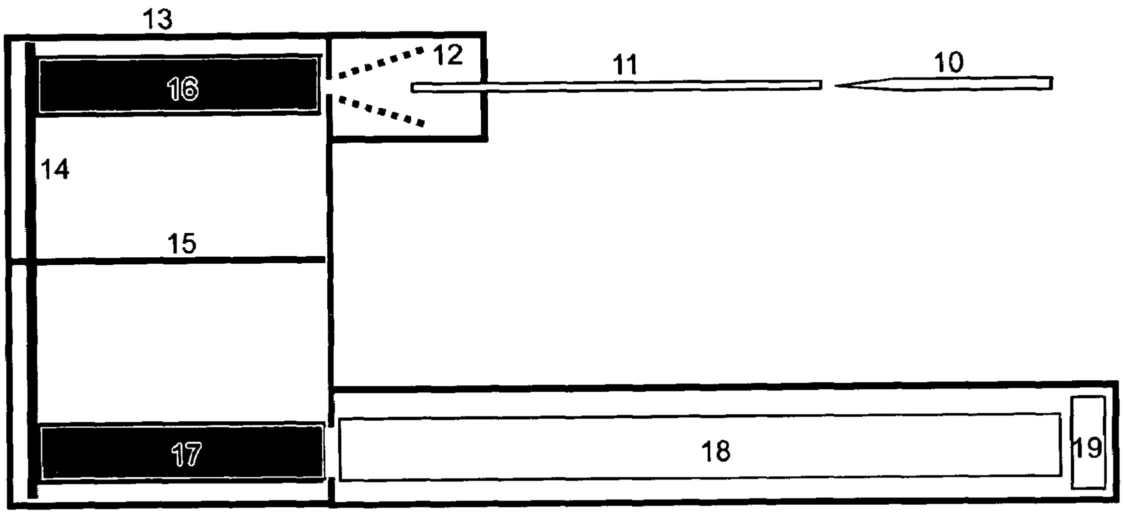
FIG. 1 shows a schematic array of a device according to this invention in which a turntable (14) carries the two cylindrical accumulators (16) and (17); the accumulator (16) is filled with ions through the capillary (11) while the ions in the accumulator (17) are analyzed by the molecular analyzer (18).

A preferred embodiment of the molecular detector is reproduced in FIG. 1. There is a nanospray ion source with a spray capillary (10) and an inlet capillary (11) to introduce the ions into the first pump stage (12) of the vacuum system. According to the invention there are two accumulators (16) and (17) to store the ions. In FIG. 1, the ions are being filled into the upper accumulator (16). The molecular detector (18) analyzes predetermined ion species quantitatively from the lower accumulator (17). The two accumulators (16) and (17) are mounted on a turntable (14) in such a way that the accumulator (16) which is at the top can be filled with ions from the ion source, while the ions of the lower accumulator (17) can be analyzed. After filling and analysis, the positions of the two accumulators (16) and (17) can be interchanged by turning the turntable (14), so that the accumulator which was previously in the analyzing position (17) can now (after emptying by setting the RF voltage to zero) be re-filled with ions of another sample.

The ions can be preferably generated in this array by a nanospray device. The analyte molecules are dissolved in liquid and located in a spray capillary (10) with an inside diameter of around 0.3 millimeters, which is metallized on the outside and extended on one side to a tip of around two to four micrometers inside diameter. Spray capillaries like this are commercially available with good dimensional stability.

As described in U.S. Pat. No. 5,504,329, a voltage of only some 1000 volts leads to the atomization of the liquid inside, in which the analyte molecules are dissolved. This creates extraordinarily small droplets with diameters of only some 200 nanometers, which are charged by the polarization of the liquid in the electric field and which completely vaporize in the heated ambient gas after only a short flight path of around one millimeter. The analyte molecules are ionized in the process, usually multiply ionized. If the nanospray capillary (10) is positioned directly in front of the inlet capillary (11), practically all ions are sucked together with ambient gas into the inlet capillary (11), and together with the ambient gas they reach a first pump stage (12) of the vacuum system of the molecular detector. The ions can be focused in a glass inlet capillary (11) by a potential gradient along the inlet capillary (11) (DE 195 15 271 C2, U.S. Pat. No. 5,736,740 A) so that only a small number of ions get lost through neutralization at the capillary wall. The potential gradient can be generated by the spray voltage.

The inlet capillary can have a length of around 20 centimeters and an inside diameter of 0.4 millimeters, for example. This generates an ambient gas current of some 0.5 liters per minute into the vacuum. The ambient gas is usually nitrogen, which is heated to around 200° C. in order to make the spray droplets vaporize.

In the first pump stage (12) of the molecular detector, the ions can be filtered out of the ambient gas, for example with an ion funnel operated with RF voltage, as described in U.S. Pat. No. 6,107,628 (R. D. Smith and S. A. Shaffer). In this pressure stage (12), which is connected directly to a roughing pump, there is typically a pressure of a few hundred Pascal. The ions are introduced into the upper accumulator (16) by a slight DC potential difference and remain there. The accumulator (16) is operated with an RF voltage, whose mid potential is below the potential of the vacuum cylinder (13) so that the ions are confined in the accumulator (16). In this upper accumulator (16), which is connected to a drag stage of a turbomolecular pump, a pressure of approximately one to ten Pascal is maintained. The ions can remain stored here for any length of time. If the ambient gas is clean and does not contain any substances with high molecular weight which could form new substance ions by ion-molecule reactions, the mixture of the analyte ions remains unchanged.

When the upper accumulator (16) has been filled with sufficient ions, and the ions of the lower accumulator (17) have been analyzed, the two accumulators are then interchanged by turning the turntable (14). In addition to the accumulators (16) and (17), the turntable (14) also has a partitioning wall (15) which separates the two half-spaces of the cylinder (13) around the accumulators into two separate vacuum chambers. This partitioning wall (15) separates the cylindrical space (13) into two separate pump stages. The partitioning wall (15) rubs with soft seals, for example rubber seals, along the wall of the cylinder (13). If the filled upper accumulator (16) is turned downwards into the position (17), it is pumped empty by the main stage of the turbo pump. The main stage of the turbo pump evacuates the whole molecular analyzer (18), which is maintained at a pressure of around a hundredth of a Pascal by a collision gas, for example helium or nitrogen, which is supplied to the instrument. This collision gas serves to dampen the oscillation of the ions in the molecular analyzer (18) and to collect the ions in the axis of the molecular analyzer.

If the pressure in the lower accumulator (17) is in equilibrium with the pressure in the molecular analyzer (18), the ions can be analyzed. To facilitate this, some $10^6$ ions are sampled between approximately 150 and several hundred times for each ion species being analyzed, and are stored in a first stage of the molecular analyzer. From this the ions under analysis are mass selectively excited, as stated in U.S. Pat. No. 6,483,109 B1, and transferred into a second stage; many ions with neighboring mass-to-charge ratios are also transferred in this process, however. The ions which are not transferred are returned to the accumulator each time. From the ions of the second stage, the analyte ions sought can be transported with higher selectivity into a third stage, and so on. If so desired, the selectivity can be increased by collision induced fragmentation, i.e. by the formation of daughter ions or even granddaughter ions.

The ions selected are ultimately measured in an ion detector (19) as pulses of ion current. The high selectivity ensures that the ions measured are those of the desired ion species of the analyte substance. By measuring a second ion species of the analyte substance, for example a second species of daughter ion, the reliability of the measurement can be further increased.

The molecular detector can be used in many fields. It is not a mass spectrometer in the true sense of the word because it generally does not measure mass spectra. Nevertheless, it can identify and quantitatively measure a number of predetermined ion species, ranging from a few tens to a few hundreds, from a predetermined quantity of ions with a high degree of certainty. The analytical procedures for each individual ion species are stored in the form of table entries; the tables contain sampling times and conditions, excitement frequencies, transfer thresholds and fragmentation voltages. The addition of reference substances makes it possible to constantly check the method and the instrument; this guarantees the accuracy of the quantity determination for the analyte substances.

The molecular detector is extraordinarily sensitive. For example, the proteins of a single cell one to two micrometers in diameter, which contains around $10^8$ protein molecules, can be fed into an accumulator and analyzed after they have been lysed and sprayed. Proteins from bodily fluids such as blood, urine, lymph and spinal or lachrymal fluid can also be enriched by immobilized capture molecules and then analyzed. Eminently suitable are magnetizable nanoparticles which have been functionalized at their surfaces, for example. Processing robots are commercially available for these magnetizable nanoparticles.

An outstanding field of application is proteomics. In investigative molecular biology or molecular medicine, for example, the distribution of already-known proteins can be investigated in order to identify different cell forms of a tissue; or changes in the frequency or modification form of already-known proteins under stress can be examined. In clinical proteomics, diseases can be diagnosed using biomarker patterns found by biomarker searches. Furthermore, distributions of mutationally changed proteins can also be measured in this way.

A further use is the clinical examination of new pharmaceuticals. This requires that the breakdown paths and breakdown kinetics of the pharmaceuticals are measured on thousands of test subjects and tens of thousands of samples. Until now, separations have been carried out by liquid chromatographs and measurements by triple quadrupole mass filters ("triple quads"), an analytical method which is extremely expensive. The measurements could be carried out, without using any chromatograph, in a molecular detector with even higher sensitivity, an instrument costing only a fraction of the price.

Figure 2A:
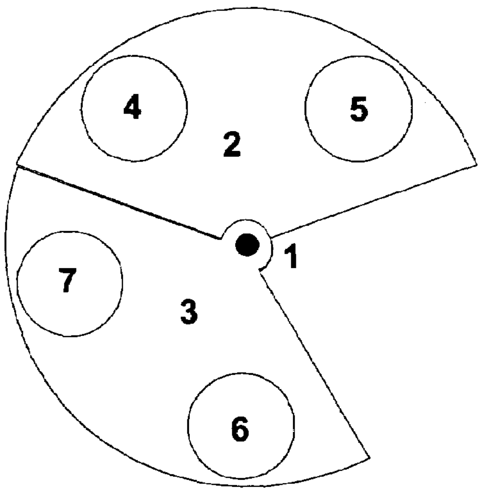
FIGS. 2*a* and 2*b* show a turntable with two movable supports (2, 3) which can rotate about an axis (1), the supports each covering ⅔ of a circle and each carrying two cylindrical accumulators (4, 5, 6, 7). In both illustrations the accumulators (4) and (5) are in the filling position.
Figure 2B:
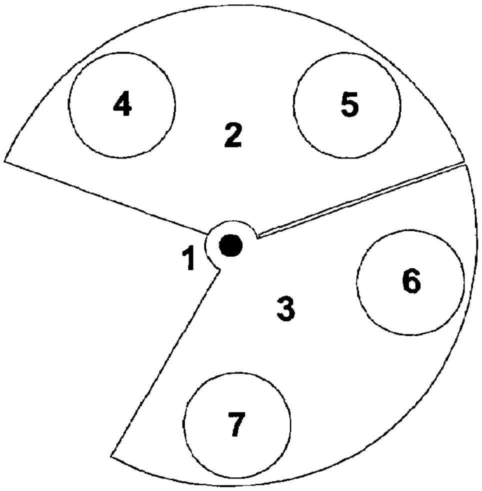

If the filling times are significantly longer than the analysis times, two or more accumulators can be simultaneously filled by several nanospray devices, while the ions from two or more previously filled accumulators are analyzed successively by a molecular analyzer. To facilitate this, two accumulator pairs on the turntable for a total of four accumulators must each be fixed on a movable support, as reproduced in FIGS. 2*a* and 2*b*. While the two accumulators (4) and (5) of the support (2) are being filled, the ions of the two accumulators (6) and (7), which are fixed to the movable support (3), can be analyzed one after the other.

Of course, very long analysis times can be split between two molecular analyzers for the parallel analysis of the ions of two accumulators, while two other accumulators are filled in turn by only one nanospray device.

Figure 3:
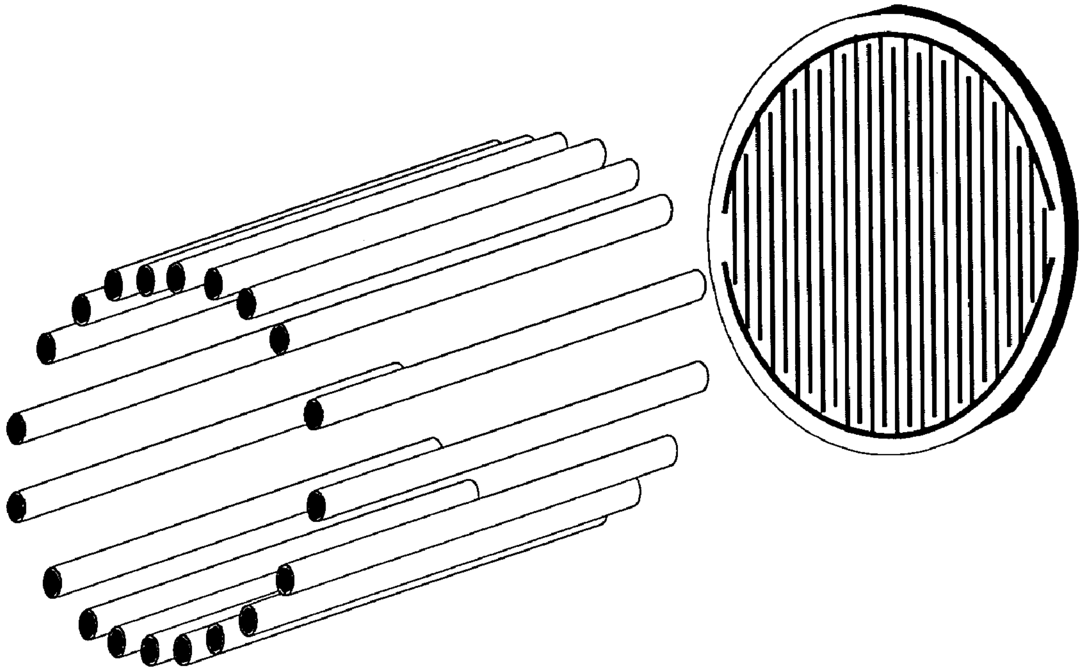
FIG. 3 illustrates an accumulator which is designed in cylindrical form as an RF multipole rod system. It is sealed at the back by a double comb-shaped grid, which is located on a printed circuit board and charged with RF voltage (for reasons of improved clarity, the double comb-shaped grid is shown removed from the back). The ions are filled in or analyzed through an opening in the front end. The front end is sealed by either an apertured diaphragm with an ion-repelling potential or by the molecular analyzer.

The accumulators are storage devices, as are known in a similar form as ion guides, for example. They can be designed as multipole rod systems, or in other forms. Multipole rod systems consist of pairs of rods arranged in the form of a cylinder around an axis, as can be seen in FIG. 3. In order to achieve a high storage capacity for ions, at least six pairs of rods are used here. The two phases of an RF voltage are applied alternatively to neighboring rods in turn, and thus form an ion-repelling pseudopotential. In this case, the RF voltage is a few hundred volts at a frequency of several megahertz. To close the end, a double grid is mounted, with which adjacent grid elements in turn carry the two phases of an RF voltage. The front opening of the multipole array is sealed by the wall of a cylindrical vacuum chamber (13), like that shown in FIG. 1, which is at an ion-repelling potential with respect to the mean voltage of the RF.

Figure 4:
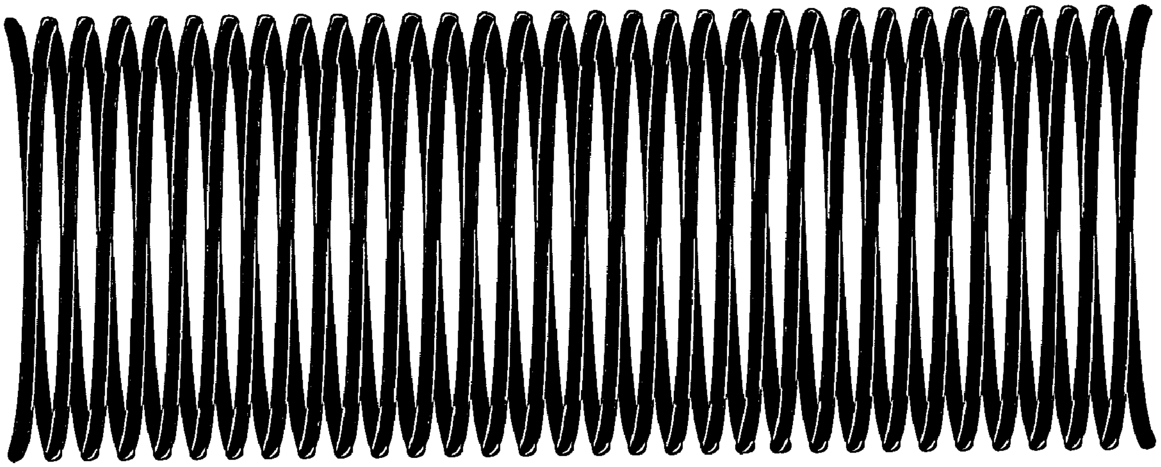
FIG. 4 shows an accumulator wound out of two helical coiled wires, which is sealed at one end by a grid array or double spiral (not shown) fed with RF voltages.
Figure 5:
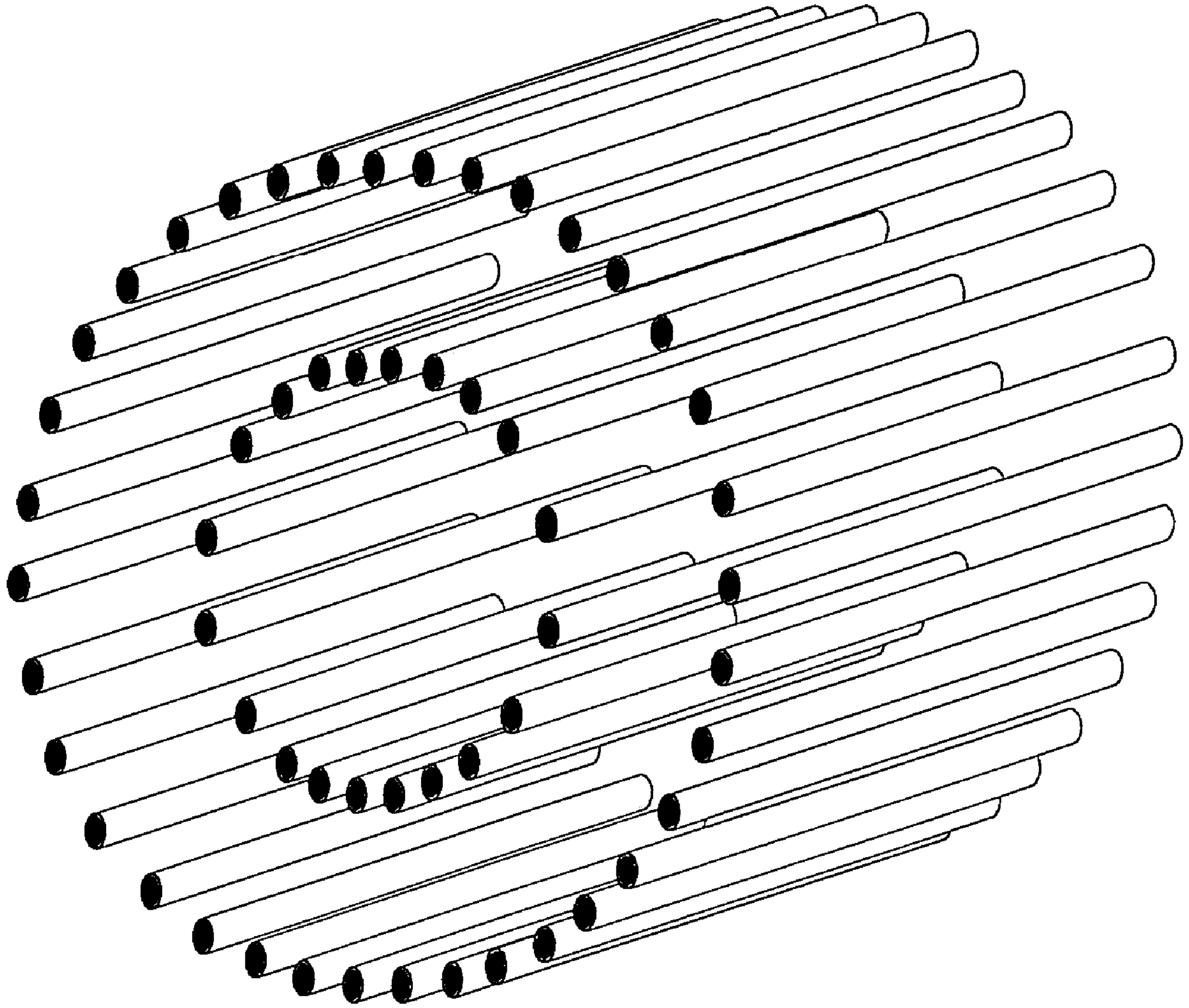
FIG. 5 represents a doubly cylindrical rod system operated with RF voltage and where electrically movable accumulators can be set up by the superimposition of DC potential depressions in the spaces between the two cylinders.

The accumulator can also consist of wire pairs wound into a double or quadruple helix, as shown in FIG. 4. Here, also, one end can be sealed by a double grid supplied with RF voltage. A further embodiment is an array of coaxial ring diaphragms, also with RF voltage.

A special design of a storage device operates with accumulators which can be moved electrically in the storage device. An example is given by two coaxial cylindrical rod systems whose rods are, as always, connected in pairs alternately to the two phases of the RF voltage. In this storage device, ions can be stored between the two rod cylinders. If DC potentials are also superimposed on the rods, one or more DC voltage depressions can be generated in the space between the two cylinders, in which ions can be stored separately. These DC voltage depressions represent the accumulator as defined in this invention. After an accumulator of this type has been filled, it can be moved into the analyzing position electrically by progressive electrical movement of the potential depressions.

Instead of the nanospray device, it is also possible to use other ion sources, for example normal electrospray ion sources with or without supplementary ionization devices such as corona discharges or UV lamps. It is also possible to use ionization devices for solid samples prepared on sample support plates by matrix-assisted laser desorption and ionization, either installed in the vacuum or at atmospheric pressure.

What is claimed is:

1. Molecular detector comprising an ion source, at least two accumulators to store ions and a molecular analyzer to analyze predetermined ion species from the accumulators, wherein the accumulators are arranged between the ion source and the analyzer in such a way that one accumulator can be fed with ions from the ion source while the ions from an other accumulator are transferred into the molecular analyzer for analysis.

2. Molecular detector according to claim 1, wherein the accumulators have only one opening each through which the ions are fed in and sampled out for analysis.

3. Molecular detector according to claim 1, wherein two accumulators are arranged on a turntable.

4. Molecular detector according to claim 1, wherein more than two accumulators are arranged on the turntable and several ion sources or several molecular analyzers are present.

5. Molecular detector according to claim 4, wherein at least two groups of accumulators are arranged on at least two movable supports so that the individual accumulators of one group can be positioned individually in front of an ion source or in front of a molecular analyzer.

6. Molecular detector according to claim 3, wherein the turntable is accommodated in a cylindrical housing and equipped with a sealing partition which rotates with it, and which separates the pump stage for feeding the accumulator with ions from the pump stage for analyzing the ions.

7. Molecular detector according to claim 1, wherein the accumulators are defined by electric RF fields with superimposed DC potential depressions, and the motion of the stored ions from the filling position into the analyzing position is created by electrical means.

8. Molecular detector according to claim 1 further comprising a means, operable when the ions from the other accumulator have been transferred into the molecular analyzer for analysis, for interchanging the one accumulator and the other accumulator so that the other accumulator can be fed with ions from the ion source while ions from the one accumulator are transferred into the molecular analyzer for analysis.

* * * * *